(12) United States Patent
Kayashima et al.

(10) Patent No.: US 9,030,729 B2
(45) Date of Patent: May 12, 2015

(54) PARTICLES FOR DISPLAY, PARTICLE DISPERSION FOR DISPLAY, DISPLAY MEDIUM, AND DISPLAY DEVICE

(71) Applicant: Fuji Xerox Co., Ltd., Tokyo (JP)

(72) Inventors: Hiroshi Kayashima, Kanagawa (JP); Jun Kawahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 80 days.

(21) Appl. No.: 14/016,809

(22) Filed: Sep. 3, 2013

(65) Prior Publication Data

US 2014/0240815 A1  Aug. 28, 2014

(30) Foreign Application Priority Data

Feb. 28, 2013  (JP) ................................ 2013-039684

(51) Int. Cl.
*G02B 26/00* (2006.01)
*G03G 17/04* (2006.01)
*C08F 20/34* (2006.01)
*G02F 1/167* (2006.01)
*C08K 5/5419* (2006.01)
*C08F 30/08* (2006.01)
*G02F 1/00* (2006.01)

(52) U.S. Cl.
CPC ................ *G02F 1/167* (2013.01); *C08F 30/08* (2013.01); *C08K 5/5419* (2013.01); *G02F 2001/1678* (2013.01); *G02F 1/0009* (2013.01); *G02F 1/0018* (2013.01); *G02F 2202/022* (2013.01); *G02F 1/0063* (2013.01)

(58) Field of Classification Search
CPC . G02F 1/167; G02F 2001/1678; G02F 1/009; G02F 1/0018; G02F 1/0063; G02F 2202/022
USPC .............................. 359/296; 430/32; 524/240
See application file for complete search history.

(56) References Cited

U.S. PATENT DOCUMENTS

| 7,226,550 B2 * | 6/2007 | Hou et al. ..................... 359/296 |
| 2003/0206330 A1 * | 11/2003 | Nomoto et al. ............... 359/296 |
| 2005/0264868 A1 * | 12/2005 | Hwang et al. ................. 359/296 |
| 2008/0193769 A1 | 8/2008 | Yanagisawa et al. |
| 2011/0216392 A1 * | 9/2011 | Baisch et al. ................. 359/296 |
| 2011/0257354 A1 | 10/2011 | Yanagisawa et al. |
| 2013/0155489 A1 * | 6/2013 | Kato et al. .................... 359/296 |
| 2013/0222883 A1 * | 8/2013 | Kayashima et al. .......... 359/296 |

FOREIGN PATENT DOCUMENTS

| JP | A 2006-96985 | 4/2006 |
| JP | A 2007-231208 | 9/2007 |
| JP | A 2010-270088 | 12/2010 |

* cited by examiner

*Primary Examiner* — Evelyn A Lester
(74) *Attorney, Agent, or Firm* — Oliff PLC

(57) ABSTRACT

Particles for display include a copolymer that contains at least, as copolymer constituents, a reactive compound containing a silicone chain or an alkyl chain and a vinyl compound represented by Formula (1), wherein a content of the reactive compound containing a silicone chain or an alkyl chain is 3.0% by weight or less with respect to the weight of the particles:

$$Ar\text{-}(H_2C=CH_2)_n \qquad \text{Formula (1)}$$

wherein in Formula (1), Ar represents an unsubstituted aromatic ring or an aromatic ring that is substituted with an alkyl group having 1 to 6 carbon atoms, or an aryl group having 6 to 12 carbon atoms, and n represents an integer from 1 to 4.

20 Claims, 3 Drawing Sheets

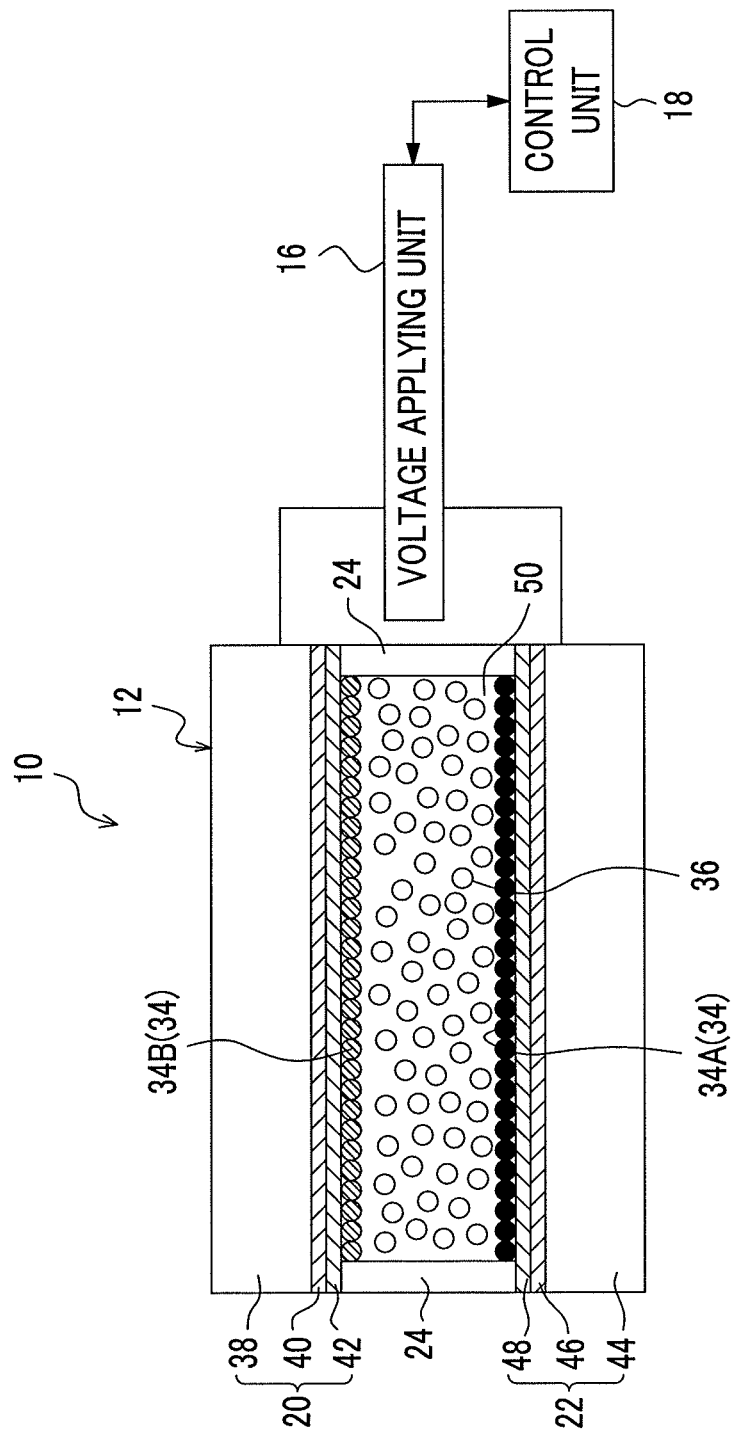

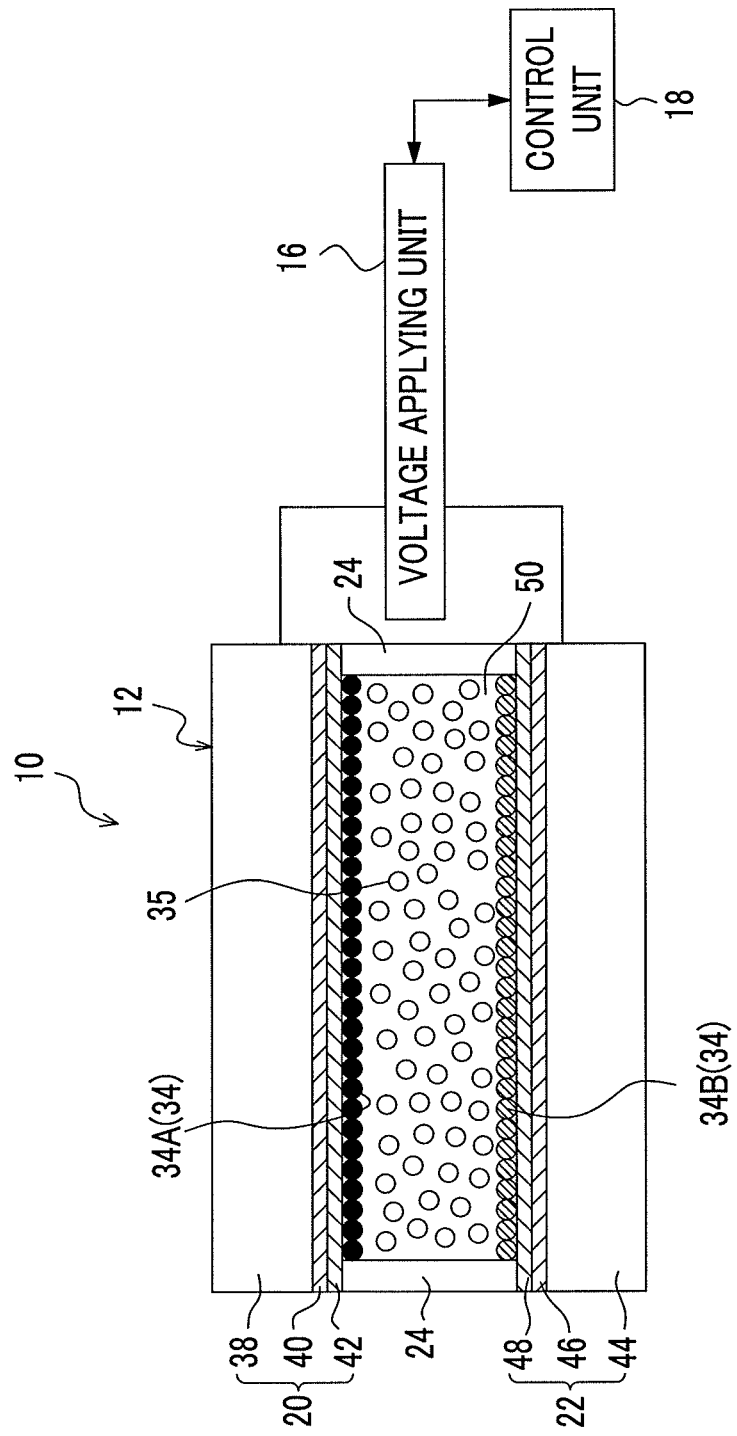

PARTICLES FOR DISPLAY, PARTICLE DISPERSION FOR DISPLAY, DISPLAY MEDIUM, AND DISPLAY DEVICE

CROSS-REFERENCE TO RELATED APPLICATIONS

This application is based on and claims priority under 35 USC 119 from Japanese Patent Application No. 2013-039684 filed Feb. 28, 2013.

BACKGROUND

1. Technical Field

The present invention relates to particles for display, particle dispersion for display, a display medium, and a display device.

2. Related Art

In the related art, a display medium using electrophoretic particles has been known as a repeatedly rewritable medium. Such a display medium includes a pair of substrates and particles which are sealed between the substrates so as to be movable between the substrates in accordance with an electric field formed between the pair of substrates, for example. In addition, particles (white particles, for example) with a low electrophoretic velocity due to an electric field are sealed between the substrates of the display medium in some cases in order to display a background color (white, for example).

SUMMARY

According to an aspect of the invention, there are provided particles for display including: a copolymer that contains at least, as copolymer constituents, a reactive compound containing a silicone chain or an alkyl chain and a vinyl compound represented by Formula (1), wherein a content of the reactive compound containing a silicone chain or an alkyl chain is 3.0% by weight or less with respect to the weight of the particles;

   Formula (1)

wherein in Formula (1), Ar represents an unsubstituted aromatic ring or an aromatic ring that is substituted with an alkyl group having 1 to 6 carbon atoms, or an aryl group having 6 to 12 carbon atoms, and n represents an integer from 1 to 4.

BRIEF DESCRIPTION OF THE DRAWINGS

Exemplary embodiments of the present invention will be described in detail based on the following figures, wherein:

FIG. 1 is an outlined configuration diagram of a display device according to an exemplary embodiment; and FIGS. 2A and 2B are explanatory diagrams schematically showing a moving state of a particle group when voltage is applied between substrates of a display medium for a display device according to an exemplary embodiment.

DETAILED DESCRIPTION

Figure 2A:
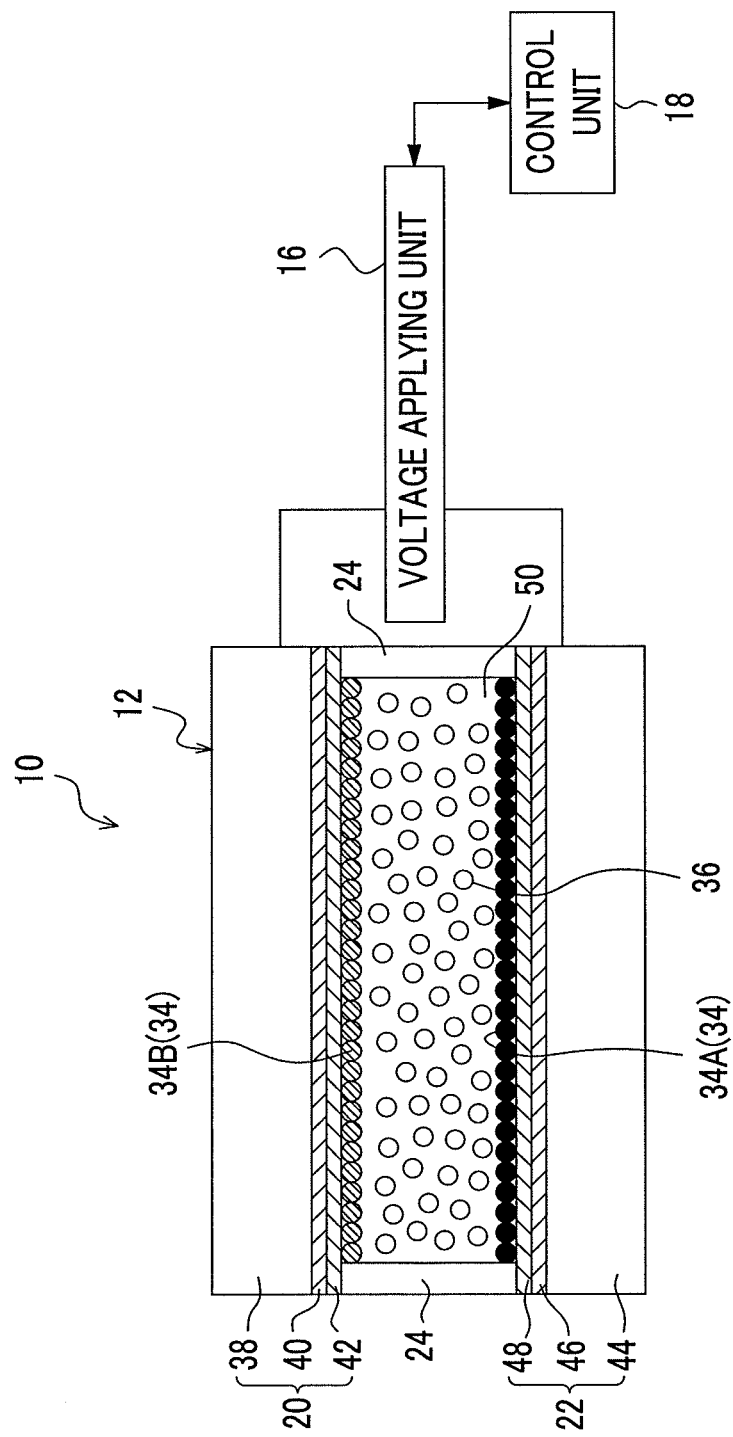

Hereinafter, a detailed description will be given of an exemplary embodiment of the present invention.

In the following explanation, a description of "(meth)acryl" means both "acryl and methacryl", a description of "(meth)acrylo" means both "acrylo and methacrylo", and a description of "(meth)acrylate" means both "acrylate and methacrylate".

Particles for Display

Particles for display according to an exemplary embodiment include copolymer (hereinafter, referred to as "specific copolymer") which contains, at least as copolymerization constituents, a reactive compound containing a silicone chain or an alkyl chain (hereinafter, referred to as a "specific compound") and a vinyl compound represented by Formula (1) (hereinafter, referred to as a "specific vinyl compound").

The content of the specific reactive compound is 3.0% by weight or less with respect to the weight of the particles. The content of the specific reactive compound is preferably from 0.05% by weight to 3% by weight, and more preferably from 1% by weight to 3% by weight from viewpoints of a refractive index and dispersibility of the particles for display.

However, the content of the specific reactive compound tends to increase as a particle size of the particles for display decreases. For this reason, the content of the specific reactive compound preferably satisfies the above range while a volume average particle size of the particles for display is within a range from 50 nm to 30,000 nm (preferably from 100 nm to 2,000 nm, and more preferably from 150 nm to 1,000 nm).

Here, the specific vinyl compound is a material which exhibits a high refractive index (for example, from 1.50 to 1.80, preferably from 1.56 to 1.70). On the other hand, the refractive index of the specific reactive compound is lower than the refractive index of the specific vinyl compound.

For this reason, the particles for display according to the exemplary embodiment become particles for display with a high refractive index by reducing the content of the specific reactive compound with a low refractive index within the above range. As a result, the particles for display according to the exemplary embodiment realize display of highly pure whiteness.

In addition, the content of the specific reactive compound means the total content of constituents derived from the specific reactive compound and an unreacted part of the specific reactive compound in the specific copolymer which are contained in the particles for display.

In addition, the content of the specific reactive compound is acquired by fluorescent X-ray analysis.

Specifically, 0.07 part by weight of dried particles for display, 0.07 part by weight of cellulose, and 0.07 part by weight of hexachloroparaxylene are blended and sufficiently mixed by using an agate mortar, pills are formed therefrom, and measurement is performed by using a fluorescent X-ray apparatus (manufactured by Rigaku Corporation). The Si amount is identified by using, as a compared element, a Cl element contained in hexachloroparaxylene, and the content of the specific reactive compound in the particles is calculated. The content of the specific reactive compound is converted based on a measurement result of a sample, which has been manufactured in advance, in which the amount of the specific reactive compound has been known.

In addition, another analysis method such as NMR may be used for the mixed amount of the specific reactive compound.

In addition, the volume average particle size of the particles for display is a value measured based on a Scanning Electron Microscope (SEM) image. Specifically, an image is obtained by an SEM (scanning electron microscope S-4800 manufactured by Hitach High-Technologies, Ltd.), and a diameter r1 (the longest part) of a single colored particle as a measurement target is then measured. Diameters of 100 colored particles are measured, r1 to r100 are then converted into spheres to obtain volumes, and a value obtained when a cumulative value of from the 1st to 100th value becomes 50% is regarded as a volume average particle size.

On the other hand, the particles for display according to the exemplary embodiment are preferably produced by copolymerizing specific copolymer of the specific reactive compound (the reactive compound which contains a silicone chain or an alkyl chain) and the specific vinyl compound (the vinyl compound which is represented by Formula (1)) with polymerizable monomer. In doing so, it is possible to easily adjust the content of the specific reactive compound within the above range. As a result, it is possible to easily obtain particles for display with a high refractive index.

Although the reasons therefor are not known, the following reasons can be considered.

It has been found out that if the particles for display are directly produced by polymerizing the specific reactive compound and the specific vinyl compound, the produced particles for display exhibit a lower refractive index than that in a case where the particles for display are produced by independently polymerizing the specific vinyl compound. This is considered to be because the specific reactive compound with a low refractive index may be easily taken into the particles and the content of the specific compound with a low reactive index in the obtained particles for display (that is, the content of the constituents derived from the specific reactive compound in the copolymer after producing the particles) increases when the particles are produced.

On the other hand, it has been discovered that if copolymer obtained in advance by polymerizing the specific reactive compound and the specific vinyl compound is used, and the copolymer and polymerizable monomer are further copolymerized to produce particles, it becomes possible to easily reduce the content of the specific reactive compound with a low refractive index in the obtained particles for display within the above range. This is considered to be because the specific reactive compound in a copolymer state where the specific reactive compound is polymerized as a copolymerization constituent is further copolymerized with polymerizable monomer to produce particles, and therefore, the silicone chain or the alkyl chain in the specific reactive compound is oriented outside the particles and is not easily taken into the particles.

In addition, it has been discovered that in particle dispersion for display which contains the particles for display according to the exemplary embodiment and a dispersion medium, an increase in viscosity is suppressed for some uncertain reasons. Specifically, the viscosity of the particle dispersion for display within a range from 2 cP to 10 cP (preferably from 2 cP to 8 cP, and more preferably from 2 cP to 5 cP), for example, is realized.

However, the viscosity of the particle dispersion for display is viscosity of 25% by weight of solid content of the particles (the content of the particles with respect to the dispersion medium) in the particle dispersion for display (dispersion medium with viscosity of 2 cs) at a temperature of 25° C.

Here, as the viscosity of the particle dispersion for display, the viscosity of dispersion is measured by using a digital viscometer LVDVII+ (manufactured by Brookfield Engineering Laboratories, Inc.).

Hereinafter, a detailed description will be given of the particles for display according to the exemplary embodiment.

The particles for display according to the exemplary embodiment include copolymer which contains, at least as copolymerimerization constituents, the specific reactive compound and the specific vinyl compound. Specifically, the particles for display include copolymer which is obtained by copolymerizing specific copolymer of the specific reactive compound and the specific vinyl compound with polymerizable monomer. That is, the particles for display preferably include copolymer of the specific copolymer and the polymerizable monomer.

Specific Copolymer

The specific copolymer is copolymer obtained by copolymerizing the specific reactive compound and the specific vinyl compound.

Specific Reactive Compound

The specific reactive compound is a reactive compound which contains a silicone chain or an alkyl chain.

Examples of the reactive compound which contains a silicone chain (polymerizable monomer which contains a silicone chain) include a dimethyl silicone compound which contains a (meth)acrylate group at one terminal (a silicone compound represented by the following Structure Formula (1); for example, SILAPLANE: FM-0711, FM-0721, and FM-0725 manufactured by JNC Corporation, X-22-174DX, X-22-2426, and X-22-2475 manufactured by Shin-Etsu Chemical Co., Ltd.) and a silicone compound which is represented by the following Structure Formulae (2) to (6).

As the reactive compound which contains a silicone chain, monomer may be used, or macromonomer may also be used. The "macromonomer" is a collective term of oligomer (with a degree of polymerization from about 2 to about 300) or polymer which contains a polymerizable functional group and has characteristics of both polymer and monomer. In addition, the reactive compound which contains a silicone chain may be used alone or in combination of multiple kinds thereof.

Structure Formula (1)

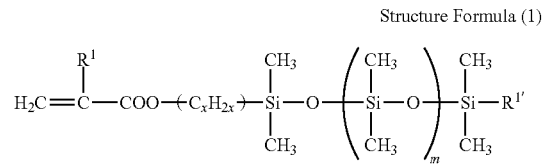

In Structure Formula (1), $R^1$ represents a hydrogen atom or a methyl group. $R^{1\prime}$ represents a hydrogen atom or an alkyl group having 1 to 4 carbon atoms. m represents a natural number (for example, from 1 to 1,000, and preferably from 3 to 100). x represents an integer from 1 to 3.

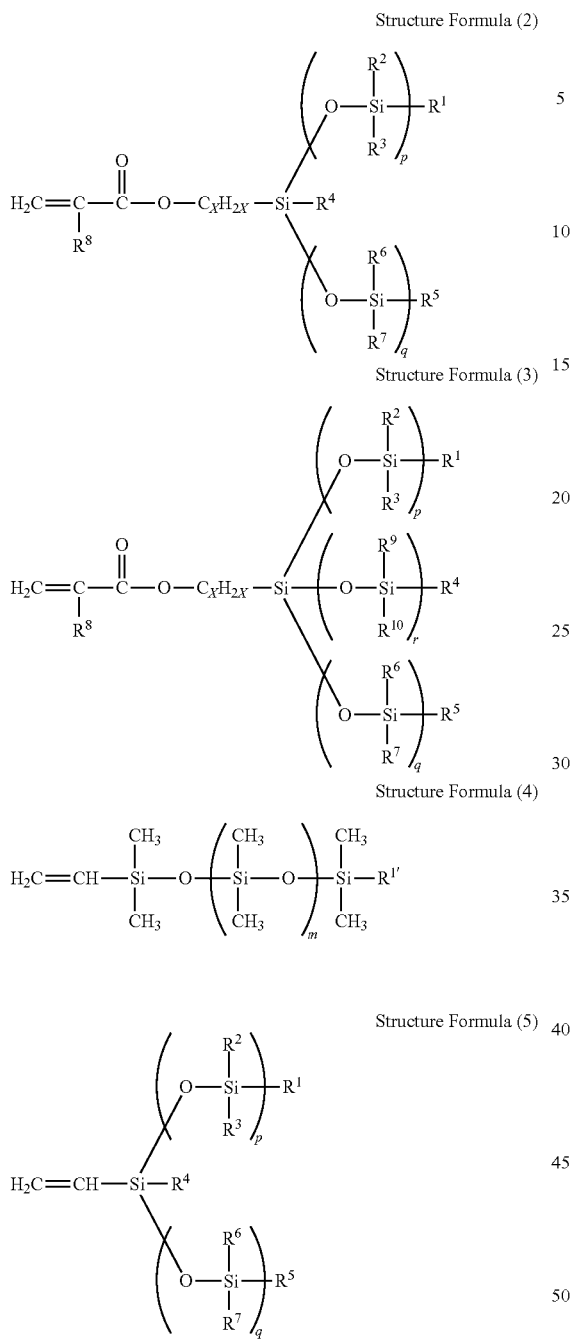

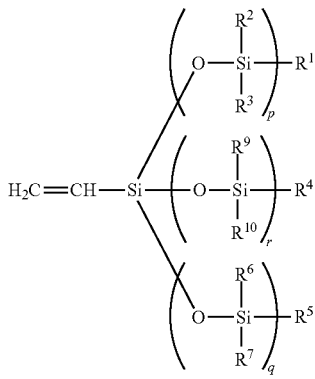

In Structure Formulae (2), (3), (5), and (6), $R^1$, $R^2$, $R^3$, $R^4$, $R^5$, $R^6$, $R^7$, $R^9$, and $R^{10}$ each independently represent a hydrogen atom, an alkyl group having 1 to 4 carbon atoms, or a fluoroalkyl group having 1 to 4 carbon atoms. $R^8$ represents a hydrogen atom or a methyl group. p, q, and r each independently represent an integer from 1 to 1,000. x represents an integer from 1 to 3.

In Structure Formula (4), $R^{1'}$ represents a hydrogen atom or an alkyl group having 1 to 4 carbon atoms. m represents a natural number (for example, from 1 to 1000, and preferably from 3 to 100). x represents an integer from 1 to 3.

The silicone compounds represented by Structure Formulae (2) and (5) preferably have configurations in which $R^1$ and $R^5$ represent butyl groups, $R^2$, $R^3$, $R^4$, $R^6$, and $R^7$ represent methyl groups, $R^8$ represents a methyl group, p and q each independently represent an integer from 1 to 5, and x represents an integer from 1 to 3.

The silicone compound represented by Structure Formulae (3) and (6) preferably have configurations in which $R^1$, $R^2$, $R^3$, $R^4$, $R^5$, $R^6$, $R^7$, $R^9$, and $R^{10}$ represent methyl groups, $R^8$ represents a hydrogen atom or a methyl group, p, q, and r each independently represent an integer from 1 to 3, and x represents an integer from 1 to 3.

Examples of the silicone compound represented by Structure Formula (2) include MCS-M11 manufactured by Gelest Inc. Examples of the silicone compound represented by Structure Formula (3) include RTT-1011 manufactured by Gelest Inc. and X22-2404 manufactured by Shin-Etsu Chemical Co., Ltd. Examples of the silicone compound represented by Structure Formula (4) include MCR-V21 manufactured by Gelest Inc. Examples of silicone compound represented by Structure Formula (5) include MCS-V12 manufactured by Gelest Inc. Examples of the silicone compound represented by Structure Formula (6) include VTT-106 manufactured by Gelest Inc. The structure formulae of such silicone compounds will be shown below.

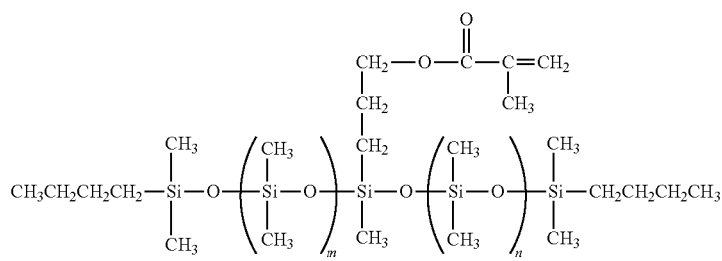

MCS-M11

MCS-M11 is a compound, in which m and n each independently represent an integer from 2 to 4 in the above structure formula, the molecular weight of which is from 800 to 1,000.

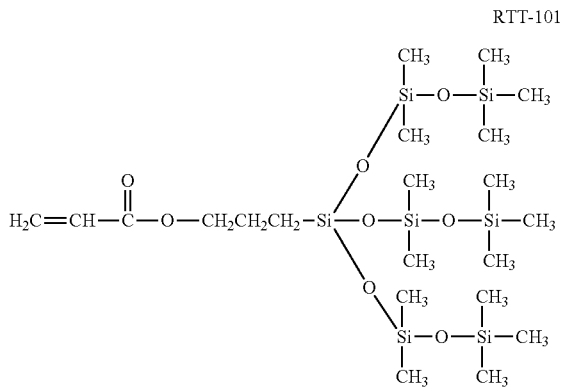

RTT-1011

RTT-1011 is a compound represented by the above structure formula.

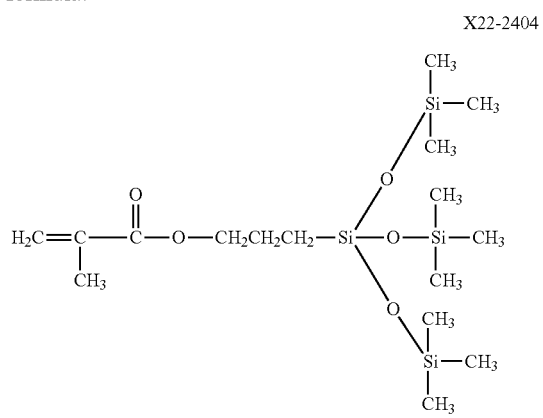

X22-2404

X22-2404 is a compound represented by the above structure formula.

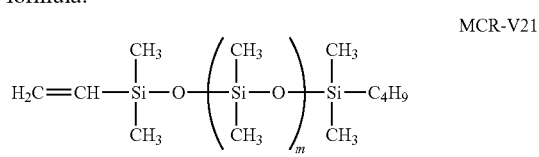

MCR-V21

MCR-V21 is a compound, in which m represents an integer from 72 to 85 in the above structure formula, the molecular weight of which is from 5500 to 6500.

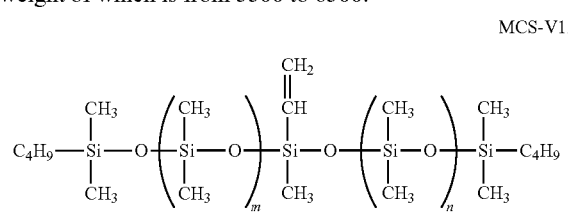

MCS-V12

MCS-V12 is a compound, in which m and n represent an integer from 6 to 12, the molecular weight of which is from 1200 to 1400.

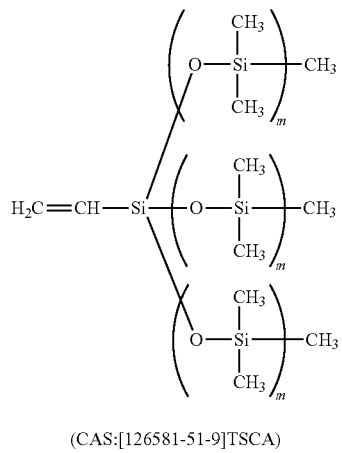

VTT-106

(CAS:[126581-51-9]TSCA)

VTT-106 is a compound represented by the above structure formula.

Examples of the reactive compound which contains an alkyl chain (polymerizable monomer which contains an alkyl chain) include ester (meth)acrylate, and specific examples thereof include methyl (meth)acrylate, butyl (meth)acrylate, hexyl (meth)acrylate, octyl (meth)acrylate, dodecyl (meth)acrylate, stearyl (meth)acrylate, and 2-ethylhexyl (meth)acrylate. Among the above examples, ester (meth)acrylate which contains a long alkyl chain, specifically an alkyl chain having 4 to 30 carbon atoms is preferably used.

Specific Vinyl Compound

The specific vinyl compound is a vinyl compound which is represented by Formula (1).

$$Ar\text{-}(H_2C\text{=}CH_2)_n \qquad \text{Formula (1)}$$

In Formula (1), Ar represents an unsubstituted aromatic ring or an aromatic ring which is substituted with an alkyl group having 1 to 6 carbon atoms or an aryl group having 6 to 12 carbon atoms, and n represents an integer from 1 to 4.

The unsubstituted aromatic ring represented by Ar in Formula (1) may be a monocyclic ring, a polycyclic ring, or a condensed ring. Examples thereof include a group obtained by removing n hydrogen atoms from: benzene (monocyclic aromatic hydrocarbon); polycyclic aromatic hydrocarbon in which multiple benzenes are singly-bonded, such as biphenyl and triphenyl; condensed ring aromatic hydrocarbon such as naphthalene, phenalene, phenanthrene, anthracene, triphenylene, pyrene, chrysene, and tetracene; a compound in which two or more kinds selected from benzene, the above polycyclic aromatic hydrocarbon, and the above condensed ring aromatic hydrocarbon are singly-bonded; a compound in which multiple benzenes are singly-bonded via an alkyl group having 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, and a hexyl group); a compound in which two or more kinds selected from benzene, the above polycyclic aromatic hydrocarbon and the above condensed ring aromatic hydrocarbon are singly-bonded via an alkyl group having one to six carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, and a hexyl group); and the like.

Among the above examples, a group which is obtained by removing n hydrogen atoms from benzene, biphenyl, or naphthalene is preferably used as the unsubstituted aromatic ring from a viewpoint of reducing the charge amount of the particles.

Examples of the alkyl group having 1 to 6 carbon atoms in the substituted aromatic ring which is represented by Ar in Formula (1) include a methyl group, an ethyl group, an n-propyl group, an isopropyl group, an n-butyl group, an isobutyl group, a sec-butyl group, a tert-butyl group, a pentyl group, and a hexyl group. On the other hand, examples of the aryl group having 6 to 12 carbon atoms include a phenyl group, a tolyl group, a mesityl group, a benzyl group, a xylyl group, and a naphthyl group.

In Formula (1), n represents an integer from 1 to 4 and is preferably 1 or 2.

As the specific vinyl compound, at least one kind selected from styrene: the following Exemplary Compound (1-1), divinylbenzene: the following Exemplary Compound (1-2), vinylbiphenyl: the following Exemplary Compound (1-3), divinylbiphenyl: the following Exemplary Compounds (1-4) and (1-5), vinylnaphthalene: the following Exemplary Compound (1-6), and divinylnaphthalene: the following Exemplary Compounds (1-7) and (1-8) is preferably used. The copolymer which contains such a specific vinyl compound is preferable from a viewpoint of easily forming particles, a viewpoint of the small charge amount of particles, and a viewpoint of high refractive index as compared with the copolymer which contains the other specific vinyl compounds.

In addition, the positions of one or two vinyl groups in divinylbenzene, vinylbiphenyl, divinylbiphenyl, vinylnaphthalene, or divinylnaphthalene are not particularly limited.

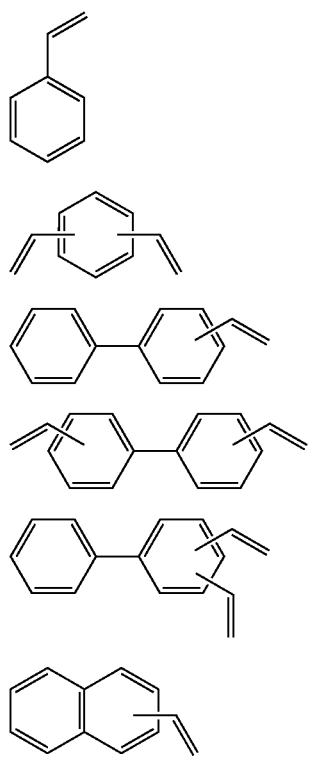

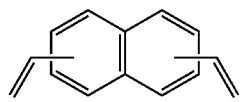

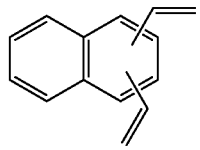

The specific vinyl compounds represented as Exemplary Compounds (1-1) to (1-8) shown above have substantially the same characteristics as a polymerization constituent, and the characteristics of copolymer which contains one of the compounds as a polymerization constituent are substantially the same. Among the above compounds, it is possible to easily obtain the specific vinyl compounds represented as Exemplary Compounds (1-1), (1-2), (1-3), and (1-6).

Characteristics of Specific Copolymer

The weight average molecular weight of the specific copolymer is from 5,000 to 2,000,000, preferably from 10,000 to 500,000, and more preferably from 30,000 to 100,000.

The weight average molecular weight of the specific copolymer is a value measured by a gel permeation chromatography (GPC).

A copolymerization ratio between the specific reactive compound and the specific vinyl compound in the specific copolymer (the specific reactive compound/the specific vinyl compound) is preferably from 0.5/99.5 to 99.5/0.5, preferably from 1/99 to 99/1, and more preferably from 3/97 to 97/3 in terms of weight ratio, for example.

In addition, the specific copolymer may be obtained by copolymerizing polymerizable monomer which will be described later as another polymerizable monomer. In such a case, however, a copolymerization ratio of another polymerizable monomer (another polymerizable monomer/(the specific reactive compound+the specific vinyl compound)) is preferably from 0.01/99.99 to 99.99/0.01 in terms of weight ratio, for example.

Polymerizable Monomer

Examples of the polymerizable monomer include a specific vinyl compound (the vinyl compound represented by Formula (1)).

Other examples of the polymerizable monomer include polymerizable monomer which does not contain a group with a charging property and polymerizable monomer which contains a group with a charging property. If polymerizable monomer which contains a group with a charging property is used as the polymerizable monomer, it is possible to easily control the electric charge of the particles for display.

In addition, such polymerizable monomer may be used alone or in combination of two or more kinds thereof.

Examples of the polymerizable monomer which does not contain a group with a charging property include non-ionic polymerization constituents such as (meth)acrylonitrile, alkyl (meth)acrylate ester, (meth)acrylamide, ethylene, propylene, butadiene, isoprene, isobutylene, N-dialkyl-substituted (meth) acrylamide, vinylcarbazole, vinyl chloride, vinylidene chloride, and vinylpyrrolidone.

On the other hand, Examples of the polymerizable monomer which contains a group with a charge property include polymerizable monomer which contains a base or an acid group as a polar group (polarizable functional group).

Here, examples of the base as a group with a charging property (hereinafter, referred to as a cationic group) include an amino group and a quaternary ammonium group (including and salts thereof). Such cationic groups tend to apply positive charge polarity to the particles, for example.

Examples of the acid group as a group with a charging property (hereinafter, referred to as an anionic group) include a phenol group, a carboxyl group, a carboxylic acid base, a sulfonic acid group, a sulfonic acid base, a phosphoric acid group, a phosphoric acid base, and a tetraphenylboron group (including salts thereof). Such anionic groups tend to apply negative charge polarity to the particles, for example.

Other examples of the group with a charging property include a fluorine group, phenyl group, and hydroxyl group.

As the polymerizable monomer which contains a cationic group (hereinafter, referred to as a cationic monomer), the following examples may be exemplified. Specific examples thereof include: (meth)acrylates which contains an aliphatic amino group such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; aromatic series-substituted ethylene monomers which contains a nitrogenous group such as dimethylaminostyrene, diethylaminostyrene, dimethylaminomethylstyrene, and dioctylaminostyrene; nitrogenous vinyl ether monomers such as vinyl-N-ethyl-N-phenylaminoethylether, vinyl-N-butyl-N-phenylaminoethylether, triethanolamine divinylether, vinyldiphenylaminoethylether, N-vinylhydroxyethylbenzamide, and m-aminophenylvinylether; pyrroles such as vinylamine and N-vinylpyrrole; pyrrolines such as N-vinyl-2-pyrroline and N-vinyl-3-pyrroline; pyrrolidines such as N-vinylpyrrolidine, vinylpyrrolidineaminoether, and N-vinyl-2-pyrrolidone; imidazoles such as N-vinyl-2-methylimidazole; imidazolines such as N-vinylimidazoline; indoles such as N-vinylindole; indolines such as N-vinylindoline; carbazoles such as N-vinylcarbazole and 3,6-dibrome-N-vinylcarbazole; pyridines such as 2-vinylpyridine, 4-vinylpyridine, and 2-methyl-5-vinylpyridine; piperidines such as (meth) acrylpiperidine, N-vinylpiperidone, and N-vinylpiperazine; quinolines such as 2-vinylquinoline and 4-vinylquinoline; pyrazoles such as N-vinylpyrazole and N-vinylpyrazoline; oxazoles such as 2-vinyloxazole; and oxazines such as 4-vinyloxazine and morpholinoethyl (meth)acrylate.

As for the cationic monomer, a salt structure may be formed by synthesizing quaternary ammonium salt before or after polymerization. Synthesis of quaternary ammonium salt is realized by causing a cationic group to react with alkyl halides or tosylic acid esters.

Examples of the polymerizable monomer which contains an anionic group (hereinafter, referred to as anionic monomer) include polymerizable monomer which contains a carboxyl group, polymerizable monomer which contains a sulfonic acid group, and polymerizable monomer which contains a phosphoric acid group.

Examples of the polymerizable monomer which contains a carboxyl group include (meth)acrylic acid, crotonic acid, itaconic acid, maleic acid, fumaric acid, and citraconic acid, anhydrides thereof, vinylethers thereof which contains a carboxyl group such as monoalkylester, carboxyethylvinylether, and carboxypropylvinylether, and salts thereof.

Examples of the polymerizable monomer which contains a sulfonic acid group include styrenesulfonic acid, 2-acrylamide-2-methylpropanesulfonic acid, 3-sulfopropyl (meth) acrylic acid ester, bis-(3-sulfopropyl)-itaconic acid ester, and salts thereof. In addition, other examples of a polymerization constituent which contains a sulfonic acid group include sulfuric monoester of 2-hydroxyethy(meth)acrylic acid and a salt thereof.

Examples of the polymerizable monomer which contains a phosphoric acid group include vinylphosphonic acid, vinyl phosphate, acid phosphoxy ethyl (meth)acrylate, acid phosphoxy propyl (meth)acrylate, bis(methacryloxyethyl) phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

As for the anionic monomer, a salt structure may be formed by synthesizing ammonium salt before or after polymerization. Synthesis of ammonium salt is realized by causing an anionic group to react with tertiary amines or quaternary ammonium hydroxides.

Examples of the polymerizable monomer which contains a fluorine group include (meth)acrylate monomer which contains a fluorine group. Specific examples thereof include trifluoroethyl (meth)acrylate, pentafluoropropyl (meth)acrylate, perfluoroethyl(meth)acrylate, perfluorobutylethyl (meth)acrylate, perfluorooctyl ethyl (meth)acrylate, perfluorodecylethyl (meth)acrylate, trifluoromethyl trifluoroethyl (meth)acrylate, and hexafluorobutyl (meth)acrylate.

Examples of the polymerizable monomer which contains a phenyl group include styrene, phenoxyethylene glycol (meth)acrylate, phenoxypolyethylene glycol (meth)acrylate, and 2-hydroxy-3-phenoxy propyl (meth)acrylate.

Examples of the polymerizable monomer which contains a hydroxyl group include hydroxyalkyl (meth)acrylate (for example, hydroxyethyl (meth)acrylate, hydroxypropyl (meth) acrylate, and the like), allyl alcohol, and polyethylene glycol mono (meth)acrylate. Other examples include monomer obtained by copolymerizing monomer which contains a glycidyl group and opening the ring, and monomer obtained by polymerizing monomer which contains a t-butoxy group and then causing the substance to undergo hydrolysis to put an OH group thereinto.

Manufacturing Method of Particles for Display

The particles for display according to the exemplary embodiment are manufactured as follows, for example.

First, the specific reactive compound and the specific vinyl compound are copolymerized to generate specific copolymer. Specifically, respective raw material constituents of the specific copolymer (the specific reactive compound, the specific vinyl compound, and the like) and other additives, as necessary, such as polymerization initiator are added to and mixed in organic solvent to prepare raw material solution, for example. Thereafter, a polymerization reaction is made to advance by heating the raw material solution, for example. In doing so, specific polymer is generated. However, the polymerization reaction is stopped before the specific polymer is precipitated and grain-shaped substances are formed.

Next, the specific copolymer and the polymerizable monomer are copolymerized to produce grains. Specifically, the polymerizable monomer and other additives, as necessary, such as polymerization initiator are further added to and mixed in the raw material solution in which the specific polymer has been generated, for example. Thereafter, the polymerization reaction is made to advance by further heating the raw material solution, for example. In doing so, copolymerization between the specific polymer and the polymerizable monomer advances, and the specific polymer and the polymerizable monomer are polymerized. The copolymer is precipitated in the raw material solution as the polymerization advances. Then, grains of the precipitated copolymer grow, and grain substances, which will be particles for display are formed in the raw material solution.

The particles for display according to the exemplary embodiment are manufactured by the above processes.

In relation to the organic solvent used here, solvent which has a characteristic that the respective raw material constituents and the specific polymer may be dissolved therein while copolymer of the specific polymer and the polymerizable monomer may not be dissolved is employed. Specific examples of the organic solvent include a single kind of hydrocarbon solvent such as paraffin and hexane and mixed solvent of such hydrocarbon solvent and silicone oil and aromatic hydrocarbon solvent such as toluene.

Particle Dispersion for Display

Next, a description will be given of particle dispersion for display using the particles for display.

The particle dispersion for display using the particles for display (particle dispersion for display according to this exemplary embodiment) includes a particle group which contains the particles for display and a dispersion medium for dispersing the particle group.

The particle dispersion for display may include other particles for display as a particle group. In addition, acid, alkali, a salt, dispersant, dispersion stabilizer, stabilizer for the purpose of preventing oxidation and absorbing an ultraviolet ray, an antibacterial agent, preservative agent, and the like may be added to the particle dispersion for display as necessary.

Although various dispersion media used for display media are applied as the dispersion medium, it is preferable to select low-dielectric solvent (with a dielectric constant of 5.0 or less, and preferably 3.0 or less, for example). Although a solvent other than the low-dielectric solvent may be used together as the dispersion medium, it is preferable to contain 50% by volume or more of the low-dielectric solvent. In addition, the dielectric constant of the low-dielectric solvent is obtained by using a dielectric constant meter (manufactured by Nihon Rufuto Co., Ltd.).

Examples of the low-dielectric solvent include petroleum-derived high-boiling point solvent such as paraffin hydrocarbon solvent, silicone oil, and fluorine solvent, and it is preferable to select low-dielectric solvent in accordance with a type of copolymer constituting the particles.

Specifically, it is preferable to select silicone oil as a dispersion medium when a reactive compound which contains a silicone chain is applied as the specific reactive compound, for example. In addition, it is preferable to select paraffin hydrocarbon solvent as a dispersion medium when a reactive compound which contains an alkyl chain is applied as the specific reactive compound. It is a matter of course that the dispersion medium is not limited thereto.

Specific examples of the silicone oil include silicone oil in which a hydrocarbon group is bonded to siloxane bond (such as dimethyl silicone oil, diethyl silicone oil, methylethyl silicone oil, methylphenyl silicone oil, and diphenyl silicone oil). Among the above examples, dimethyl silicone is particularly preferable.

Examples of the paraffin hydrocarbon solvent include normal paraffin hydrocarbon and isoparaffin hydrocarbon having 20 or more carbon atoms, (boiling point: 80° C. or higher), and isoparaffin is preferably used for reasons of safety, a volatile property, and the like. Specific examples thereof include Shellsol 71 (manufactured by Showa Shell Sekiyu K. K.), Isopar O, Isopar H, Isopar K, Isopar L, Isopar G, and Isopar M (Isopar is a product name of Exxon Mobil Corporation), and IP solvent (manufactured by Idemitsu Kosan Co., Ltd.).

Examples of charge-controlling agent include ionic or non-ionic surfactant, block or graft copolymers which include a lipophilic part and a hydrophilic part, a compound which contains a polymer chain skeleton such as a cyclic, star, or dendritic polymer (dendrimer), copolymer of a metal complex of salicylic acid, a metal complex of catechol, metallized bisazo dye, a tetraphenylborate derivative, polymerizable silicone macromer (SILAPLANE manufactured by JNC Corporation) with anion monomer or cation polymer.

More specific examples of the ionic and non-ionic surfactant are as follows. Examples of the non-ionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylenesorbitan fatty acid ester, and fatty acid alkylolamide. Examples of the anionic surfactant include alkylbenzene sulfonate, alkylphenyl sulfonate, alkylnaphthaline sulfonate, higher fatty acid salt, sulfate of higher fatty acid ester, and sulfonic acid of higher fatty acid ester. Examples of the cationic surfactant include primary to tertiary amine salts, and a quaternary ammonium salt.

The amount of such charge-controlling agent used is preferably from 0.01% by weight to 20% by weight, and more preferably from 0.05% by weight to 10% by weight with respect to the solid content of the particles.

The concentration of the electrophoretic particles in the electrophoretic particle dispersion according to this exemplary embodiment is selected in various manners in accordance with a display property, a response property, or a purpose of use thereof and is preferably selected within a range from 0.1% by weight to 30% by weight. When particles with different colors are mixed therein, the total amount of the particles is preferably within the above range.

The particle dispersion for display according to this exemplary embodiment is used in a display medium based on an electrophoretic scheme, a light adjusting medium (light adjusting element) based on the electrophoretic scheme, a liquid toner of an electrophotographic system based on a liquid development scheme, and the like. In addition, as display media based on the electrophoretic scheme and the light adjusting media (light adjusting elements) based on the electrophoretic scheme, a known scheme in which the particle group is moved in a direction in which an electrode (substrate) surface faces, a scheme in which the particle group is moved in a direction along the electrode (substrate) surface unlike the above scheme (so-called an in-plane type element), and a hybrid element of a combination thereof are exemplified.

In addition, if the electrophoretic particle dispersion according to this exemplary embodiment is used while plural kinds of particles with different colors and different charge polarities are mixed therein as electrophoretic particles moving in accordance with an electric field, color display is realized.

Here, the particles for display (and dispersion thereof) according to this exemplary embodiment may be applied as electrophoretic particles (and dispersion thereof) which moves in accordance with an electric field, or may be applied as non-electrophoretic particles (and dispersion thereof) with a low charge amount with a lower response speed, at which the particles move in accordance with an electric field, than that of the electrophoretic particles, which does not substantially move in accordance with the electric field.

Display Medium and Display Device

A description will be given of an example of a display medium and a display device according to the exemplary embodiment. The particles for display according to this exemplary embodiment are applied as white particles for display in the following example, and the description will be given on the assumption that the particles for display according to this exemplary embodiment are white particles for display.

FIG. 1 is an outlined configuration diagram of a display device according to this exemplary embodiment. FIG. 2 is an explanatory diagram schematically showing a moving state of the particle group when voltage is applied between substrates of the display medium for the display device according to this exemplary embodiment.

A display device 10 according to this exemplary embodiment has a configuration in which electrophoretic particle group with a color other than white, which moves in accordance with an electric field, is applied as a particle group 34 of a display medium 12 and the white particle group including the white particles for display according to this exemplary embodiment is applied as a reflective particle group 36.

In addition, the display device 10 has a configuration in which a particle group 34A and a particle group 34B with a different color and a different charge polarity from those of the particle group 34A are applied as the particle group 34.

The display device 10 according to this exemplary embodiment includes the display medium 12, a voltage applying unit 16 which applies voltage to the display medium 12, and a control unit 18 as shown in FIG. 1.

The display medium 12 includes a display substrate 20 which functions as an image display surface, a back substrate 22 which faces the display substrate 20 with a gap interposed therebetween, a gap member 24 which maintains a specific interval between the substrates and sections the space between the display substrate 20 and the back substrate 22 into multiple cells, and a reflective particle group 36 which exhibits a different optical reflective property from that of the particle group 34 sealed in the respective cells.

Each of the cells indicates a region which is surrounded by the display substrate 20, the back substrate 22, and the gap member 24. The dispersion medium 50 is sealed in the respective cells. The particle group 34 is configured by multiple particles, and the multiple particles are dispersed in the dispersion medium 50 and move (migrate) between the display substrate 20 and the back substrate 22 through the gap between the particles of the reflective particle group 36 in accordance with strength of an electric field formed in each cell.

In addition, the display medium 12 may be configured to perform display for each pixel by providing the gap member 24 so as to correspond to each pixel when an image is displayed on the display medium 12 and forming the cells so as to correspond to the respective pixels.

A description will be given of this exemplary embodiment with reference to a drawing in which attention is paid to a cell in order to simplify the description. Hereinafter, each configuration will be described in detail.

First, a description will be given of a pair of substrates.

The display substrate 20 has a configuration in which a surface electrode 40 and a surface layer 42 are laminated in this order on a support substrate 38. The back substrate 22 has a configuration in which a back surface electrode 46 and a surface layer 48 are laminated on a support substrate 44.

The display substrate 20 or both the display substrate 20 and the back substrate 22 exhibit a translucency. Here, translucency described in this exemplary embodiment means that transmittance of visible light is 60% or more.

Examples of a material of the support substrate 38 and the support substrate 44 include glass, plastic, polyethylene terephthalate resin, polycarbonate resin, acrylic resin, polyimide resin, polyester resin, epoxy resin, and polyethersulfone resin.

Examples of a material of the surface electrode 40 and the back surface electrode 46 include oxidation products of indium, tin, cadmium, and antimony, composite oxidation products such as ITO, metal such as gold, silver, copper, and nickel, and organic materials such as polypyrrole and polythiophene. The surface electrode 40 and the back surface electrode 46 may be configured as single-layer films, mixed films, or composite films of the above materials. The thickness of the surface electrode 40 and the back surface electrode 46 is preferably from 100 angstrom to 2000 angstrom. The back surface electrode 46 and the surface electrode 40 may be formed into a matrix shape or a stripe shape, for example.

In addition, the surface electrode 40 may be embedded in the support substrate 38. Moreover, the back surface electrode 46 may be embedded in the support substrate 44. In such a case, a material of the support substrate 38 and the support substrate 44 is selected in accordance with a composition or the like of the respective particles in the particle group 34.

In addition, each of the back surface electrode 46 and the surface electrode 40 may be separated from the display substrate 20 and the back substrate 22 and arranged outside the display medium 12.

Although the electrodes (the surface electrode 40 and the back surface electrode 46) are provided at both the display substrate 20 and the back substrate 22 in the above description, the electrodes may be provided at only one of the substrates so as to implement active matrix drive.

In order to implement active matrix drive, the support substrate 38 and the support substrate 44 may be provided with a thin-film transistor (TFT) for each pixel. The TFT is preferably provided at the back substrate 22 instead of the display substrate.

Next, a description will be given of the surface layer.

The surface layer 42 and the surface layer 48 are formed on the surface electrode 40 and the back surface electrode 46, respectively. Examples of a material configuring the surface layer 42 and the surface layer 48 include polycarbonate, polyester, polystyrene, polyimide, epoxy, polyisocyanate, polyamide, polyvinyl alcohol, polybutadiene, polymethylmethacrylate, copolymer nylon, ultraviolet curable acrylic resin, and fluorine resin.

The surface layer 42 and the surface layer 48 may include the above resin and a charge transport material, or may include self-supporting resin which exhibits a charge transport property.

Next, a description will be given of the gap member.

The gap member 24 for maintaining a gap between the display substrate 20 and the back substrate 22 is made of thermoplastic resin, heat-curable resin, electron beam curable resin, photo-curable resin, rubber, metal, or the like.

The gap member 24 may be integrated with any one of the display substrate 20 and the back substrate 22. In such a case, the gap member 24 is produced by performing an etching treatment for etching the support substrate 38 or the support substrate 44, a laser processing treatment, a press processing treatment using a mold produced in advance, or a print treatment.

In such a case, the gap member 24 is produced on any one of the display substrate 20 side and the back substrate 22 side or on both the sides.

The gap member 24 may be colored or colorless. However, the gap member 24 is preferably colorless and transparent. In such a case, the gap member 24 is made of transparent resin such as polystyrene, polyester, and acryl.

In addition, the grain-shaped gap member 24 is also preferably transparent, and glass particles are also used as well as transparent resin particles of polystyrene, polyester, acryl, or the like.

In addition, "transparent" means that the transmission with respect to visible light is 60% or greater.

Next, a description will be given of the particle group.

The particle group 34 sealed in the display medium 12 is also preferably dispersed in a polymer resin as dispersion medium 50. Preferable examples of the polymer resin include polymer gel and high-molecular polymer.

Examples of the polymer resin include polymer gel derived from natural polymer such as agarose, agaropectin, amylose, sodium alginate, alginic acid propylene glycol ester, isolichenan, insulin, ethylcellulose, ethylhydroxyethylcellulose, curdlan, casein, carrageenan, carboxymethylcellulose, carboxymethyl starch, callose, agar, chitin, chitosan, silk fibroin, guar gum, quince seed, crown-gall polysaccharide, glycogen, glucomannan, keratan sulfate, keratin protein, collagen, cellulose acetate, gellan gum, schizophyllan, gelatin, phytelephas macrocarpa mannan, tunicin, dextran, dermatan sulfate, starch, tragacanth gum, nigeran, hyaluronic acid, hydroxyethycellulose, hydroxypropylcellulose, pustulan, funoran, degradative xyloglucan, pectin, porphyran, methylcellulose, methyl starch, laminaran, lichenan, lentinan, and locust bean gum. In addition, almost all kinds of polymer gel can be exemplified in a case of synthetic polymer.

Furthermore, it is possible to exemplify polymer which contains functional groups of alcohol, ketone, ether, ester, and amide in a repeated unit, and examples thereof include polyvinyl alcohol, poly(meth)acrylamide and a derivative thereof, polyvinylpyrrolidone, polyethylene oxide, and copolymer containing such polymer.

Among the above examples, gelatin, polyvinyl alcohol, poly(meth)acrylamide, and the like are preferably used from viewpoints of production stability, an electrophoretic property, and the like.

Such polymer resin is preferably used with the insulating liquid as the dispersion medium 50.

The particle group 34 sealed in the respective cells includes multiple particles, and the multiple particles are dispersed in the dispersion medium 50 and moves between the display substrate 20 and the back substrate 22 in accordance with strength of an electric field formed in each cell.

Examples of the particles of the particle group 34 include glass beads, insulating metal oxide particles such as alumina, and titanium oxide, thermoplastic or heat-curable resin particles, particles obtained by fixing colorant to the surfaces of such resin particles, particles containing insulating colorant in thermoplastic or heat-curable resin, and metal colloid particles with a plasmon color-producing function.

Examples of the thermoplastic resin used in manufacturing the particles of the particle group 34 include monopolymer or copolymer of styrenes such as styrene and chlorostyrene, monoolefin such as ethylene, propylene, butylene, and isoprene, vinyl ester such as vinyl acetate, vinyl propionate, vinyl benzoate, and vinyl butyrate, α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers such as vinyl methyl ether, vinyl ethyl ether, and vinyl butyl ether and vinyl ketones such as vinyl methyl ketone, vinyl hexyl ketone, and vinyl isopropenyl ketone.

In addition, examples of the heat-curable resin used in manufacturing the particles of the particle group 34 include cross-linked resin such as cross-linked copolymer which contains divinylbenzene as a main constituent and cross-linked polymethylmethacrylate, phenol resin, urea resin, melamine resin, polyester resin, and silicone resin. In particular, representative examples of binder resin include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

It is possible to use organic or inorganic pigment, oil-soluble dye, or the like as the colorant, and examples thereof include magnetic powder such as magnetite and ferrite and known colorant such as carbon black, titanium oxide, magnesium oxide, zinc oxide, copper phthalocyanin-based cyan coloring material, azo-based yellow coloring material, azo-based magenta coloring material, quinacridone-based magenta coloring material, red coloring material, green coloring material, and blue coloring material. Specifically, representative examples thereof include aniline blue, calco oil blue, chrome yellow, ultramarine blue, DuPont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3. Such colorant may be used in combination with multiple coloring materials.

A charge-controlling agent may be added to the resin of the particles of the particle group 34 as necessary. It is possible to use a known charge-controlling agent used as an electrophotographic toner, and examples thereof include cetylpyridyl chloride, quaternary ammonium salt such as BONTRON P-51, BONTRON P-53, BONTRON E-84, and BONTRON E-81 (all of which are manufactured by Orient Chemical Industries Co., Ltd.), a salicylic acid metal complex, a phenol condensation product, a tetraphenyl compound, oxidized metal particles, oxidized metal particles which has been surface-treated by various coupling agents.

A magnetic material may be mixed inside or on the surfaces of the particles of the particle group 34 as necessary. As the magnetic material, a color-coated inorganic magnetic material or organic magnetic material is used as necessary. In addition, a transparent magnetic material, especially a transparent organic magnetic material is more preferably used since such a material does not inhibit color producing of the coloring pigment and has a smaller specific weight as compared with the inorganic magnetic material.

As colored magnetic powder, colored magnetic powder with a small diameter which is disclosed in JP-A-2003-131420 may be used. The magnetic powder provided with a magnetic particle as a core and a colored layer laminated on the surface of the magnetic particle is used. Although the colored layer may be arbitrarily selected, and for example, the magnetic powder may be colored by pigment or the like so as not to be transparent, it is preferable to use a light interference thin film, for example. The light interference thin film is a thin film obtained by shaping an achromatic coloring material such as $SiO_2$ or $TiO_2$ into a thin film with the same thickness as a light wavelength and selectively reflects light depending on a wavelength by light interference in the thin film.

An external additive may adhere to the surfaces of the particles of the particle group 34 as necessary. The color of the external additive is preferably transparent so as not to affect the color of the particles of the particle group 34.

As the external additive, inorganic particles of metal oxide such as silicon oxide (silica), titanium oxide, and alumina are used. Such particles may be surface-treated by a coupling agent or silicone oil in order to adjust a charging property, fluidity, environment dependency, and the like of the particles of the particle group 34.

Coupling agents are classified into positively charged coupling agent such as an amino silane coupling agent, an amino titanium coupling agent, and a nitrile coupling agent and negatively charged coupling agent such as a silane coupling agent which does not contain a nitrogen atom (which is configured by atoms other than nitrogen), a titanium coupling agent, an epoxy silane coupling agent, and an acryl silane coupling agent. In addition, silicone oil is classified into positively charged silicone oil such as amino-modified silicone oil and negatively charged silicone oil such as dimethyl silicone oil, alkyl-modified silicone oil, α-methylsulfone-modified silicone oil, methylphenyl silicone oil, chlorophenyl silicone oil, and fluorine-modified silicone oil. Such a coupling agent and silicone oil are selected in accordance with desired resistance of the external additive.

Hydrophobic silica and hydrophobic titanium oxide which are well known are preferably used among the above external additives, and a titanium compound obtained by a reaction between $TiO(OH)_2$ and a silane compound such as a silane coupling agent as disclosed in JP-A-10-3177 is preferably used. As the silane compound, any type out of chlorosilane, alkoxysilane, silazane, and a special silylation reagent may be used. The titanium compound is produced by causing a reaction of $TiO(OH)_2$ produced in a wet process with a silane compound or silicone oil and drying the reactant. Strong bond of Ti is not formed and aggregation does not occur since a burning process at several hundred degrees Celsius is not performed, and therefore, the particles of the particle group 34 are in a state of primary particles. Furthermore, $TiO(OH)_2$ is caused to directly react with a silane compound or silicone oil, and therefore, it is possible to increase a process amount of the silane compound or the silicone oil, control the charging property by adjusting the process amount of the silane compound, and enhance applied charge ability as compared with that of titanium oxide in the related art.

The volume average particle size of the external additive is generally from 5 nm to 100 nm, and preferably from 10 nm to 50 nm. However, the volume average particle size thereof is not limited thereto.

A compounding ratio between the external additive and the particles of the particle group 34 is adjusted depending on a balance between the particle size of the particles the particle group 34 and the particle size of the external additive. If the additive amount of the external additive is excessively large, a part of the external additive is disengaged from the surface of a particle of the particle group 34 and adhered to a surface of another particle of the particle group 34, and a desired charging property may not be achieved. The amount of the external additive is generally from 0.01 part by weight to 3 parts by weight, and preferably from 0.05 part by weight to 1 part by weight with respect to 100 parts by weight of the particles of the particle group 34.

The external additive may be added to only one kind out of multiple kinds of particles of the particle group 34, or may be added to multiple kinds or all the kinds of the particles of the particle group 34. When the external additive is added to the surfaces of all the particles of the particle group 34, it is preferable to apply the external additive to the surfaces of the particles of the particle group 34 by impact force or solidly fix the external additive to the surfaces of the particles of the particle group 34 by heating the surfaces of the particles of the particle group 34. In doing so, it is possible to prevent disengaging the external additive from the particles of the particle group 34, solidly aggregating the external additive with different polarities, and forming aggregate of the external additive which may not be easily separated by an electric field, and to thereby prevent image quality from deteriorating.

Since the particles of the particle group 34 move between the display substrate 20 and the back substrate 22 in accordance with an electric field formed between the substrates, a description will be given on the assumption that characteristics which contribute to the motion in accordance with the electric field, such as an average charge amount and an electrostatic amount, are adjusted in advance.

Specifically, the average charge amount of the particles of the particle group 34 may be adjusted by adjusting a type and an amount of the aforementioned charge-controlling agent to be blended in the resin, a type and an amount of polymer chains to be coupled to the surfaces of the particles of the particle group 34, a type and an amount of the external additive to be added to or embedded in the surfaces of the particles of the particle group 34, types and amounts of surfactant, polymer chains and a coupling agent to be applied to the surfaces of the particles of the particle group 34, a specific surface area of the particles of the particle group 34 (a volume average particle size and a shape coefficient of the particles of the particle group 34), and the like.

As a method for producing the particles of the particle group 34, any known method in the related art may be used. For example, a method in which resin, pigment, and a charge-controlling agent are measured so as to achieve a specific compound ratio, the resin is heated and melted, the pigment is then added, mixed, and dispersed, the object is cooled, particles of the particle group 34 are then prepared by using a pulverizer such as jet mill, hammer mill, or turbo mill, and the obtained particles of the particle group 34 is then dispersed in a dispersion medium as disclosed in JP-A-7-325434 is used. Alternatively, particles of the particle group 34, which are made to contain a charge-controlling agent by a polymerization method such as suspension polymerization, emulsion polymerization, or dispersion polymerization, coacervation, melt dispersion, emulsion condensation method, or the like, may be prepared and then dispersed in a dispersion medium to produce the dispersion medium of the particles of the particle group 34. Furthermore, there is also a method using an appropriate apparatus for dispersing and kneading the aforementioned resin, the colorant, the charge-controlling agent, and the raw materials of the dispersion medium at a temperature, at which the resin may be plasticized and the dispersion medium does not boil, which is lower than a decomposition point of the resin, the charge-controlling agent, and/or the colorant. Specifically, the pigment, the resin, and the charge-controlling agent are heated and melted in the dispersion medium by a planetary mixer or a kneader, the melted and mixed substance is cooled while stirred by using temperature dependency of the solubility of the resin with respect to solvent, and the particles of the particle group 34 are solidified/precipitated and produced.

Furthermore, a method in which the aforementioned raw materials are poured into an appropriate container with granular media for dispersion and kneading, for example, an attritor or a heated oscillating mill such as heated ball mill, and the container is subjected to dispersion and kneading in a preferable temperature range from 80° C. to 160° C., for example, is used. As the granular media, steel such as stainless steel or carbon steel, alumina, zirconia, silica, or the like is preferably used. In order to produce the particles of the particle group 34 by this method, the raw materials which are brought into a fluidized state in advance are further dispersed in a container by granular media, the dispersion medium is then cooled, and resin including colorant is made to settle out from the dispersion medium. The granular media continuously maintain a moving state even during and after the cooling, cause shear and/or impact, and decrease the particle size.

The content (% by weight) of the particle group 34 with respect to the total weight in the cells is not particularly limited as long as concentration at which a desired color phase is obtained may be achieved, and it is effective to adjust the content thereof depending on the thickness of the cells (that is, a distance between the display substrate 20 and the back substrate) for the display medium 12. That is, it is possible to reduce the content as the thickness of the cells increases, and increase the content as the thickness of the cells decreases, in order to obtain a desired color phase. The content is generally from 0.01% by weight to 50% by weight.

Next, a description will be given of the reflective particle group.

The reflective particle group 36 is configured by reflective particles with different optical reflective property from that of the particle group 34 and functions as a reflective member for displaying a different color from that of the particle group 34. In addition, the reflective particle group 36 also functions as a gap member which causes the particles to move between the display substrate 20 and the back substrate 22 without disturbing the movement. That is, the respective particles of the particle group 34 move from the side of the back substrate 22 to the side of the display substrate 20 or from the side of the display substrate 20 to the side of the back substrate 22 through the gaps of the reflective particle group 36.

In addition, the white particle group of white particles for display according to the exemplary embodiment is applied as the reflective particle group 36.

Next, a description will be given of other configurations of the display medium.

The size of each cell in the display medium 12 has a close relationship with resolution of the display medium 12. It is possible to produce a display medium 12 which displays an image with higher resolution if the cell size is smaller, and the length of the display medium 12 in a panel direction of the display substrate 20 is generally from about 10 µm to about 1 mm.

In order to fix the display substrate 20 and the back substrate 22 via the gap member 24, a fixing method such as a combination of a bolt and a nut, a clamp, a clip, or a frame for fixing substrates is used. In addition, another fixing method such as adhesion, thermal fusion, or ultrasonic bonding may be used.

The display medium 12 configured as described above is used in a bulletin board, a notice board, an electronic blackboard, an advertisement, a name board, a blinking sign, an electronic paper, an electronic newspaper, an electronic book, a document sheet which is shared with a copy machine and a printer, or the like, on which images are stored and rewritten.

Next, a description will be given of the display device.

The display device 10 according to the exemplary embodiment includes the display medium 12, the voltage applying unit 16 which applies voltage to the display medium 12, and the control unit 18 as described above (see FIG. 1).

The voltage applying unit 16 is electrically connected to the surface electrode 40 and the back surface electrode 46. Although the description will be given of a case where both the surface electrode 40 and the back surface electrode 46 are electrically connected to the voltage applying unit 16 in this exemplary embodiment, another configuration is also applicable in which one of the surface electrode 40 and the back surface electrode 46 is grounded and the other is connected to the voltage applying unit 16.

The voltage applying unit 16 is connected to the control unit 18 so as to exchange signals with the control unit 18.

The control unit 18 may be configured as a microcomputer which includes a Central Processing Unit (CPU) which manages operations of the entire apparatus, a Random Access Memory (RAM) which temporarily stores various kinds of data thereon, and a Read Only Memory (ROM) which stores various programs such as a control program for controlling the entire apparatus in advance.

The voltage applying unit 16 is a voltage application device that applies voltage to the surface electrode 40 and the back surface electrode 46 and applies voltage in accordance with control by the control unit 18 between the surface electrode 40 and the back surface electrode 46.

Next, a description will be given of actions of the display device 10. The actions will be described with the operations of the control unit 18.

Here, a description will be given of a case where the particle group 34A of the particle group 34 sealed in the display medium 12 is negatively charged while the particle group 34B is positively charged. In addition, a description will be given on the assumption that the dispersion medium 50 is transparent and the color of the reflective particle group 36 is white. That is, a description will be given of a case where the display medium 12 displays colors of the particle group 34A and the particle group 34B in accordance with the motion thereof and displays white color as a background color thereof in this exemplary embodiment.

First, an initial operation signal which indicates that voltage is applied for a predetermined time such that the surface electrode 40 functions as a negative electrode and the back surface electrode 46 functions as a positive electrode is output to the voltage applying unit 16. If negative voltage which is equal to or more than threshold voltage at which variations in concentration end is applied between the substrates, the negatively charged particles constituting the particle group 34A move to the side of the back substrate 22 and reach the back substrate 22 (see FIG. 2A). On the other hand, the positively charged particles constituting the particle group 34B move to the side of the display substrate 20 and reach the display substrate 20 (see FIG. 2A).

As for the color of the display medium 12 visually recognized from the side of the display substrate 20 at this time, the color of the particle group 34B is visually recognized while white color of the reflective particle group 36 is visually recognized as a background color. In addition, the particle group 34A is hidden by the reflective particle group 36, and it becomes difficult to visually recognize the particle group 34A.

Time T1 may be stored in advance as information indicating time of voltage application in the initial operation on a memory such as the ROM, which is not shown in the drawing, in the control unit 18. Then, the information indicating the specific time may be read in executing the processing.

Next, if voltage is applied between the surface electrode 40 and the back surface electrode 46 while polarities are inverted from the voltage applied between the substrates, that is, voltage is applied such that the surface electrode 40 functions as a positive electrode and the back surface electrode 46 functions as a negative electrode, the negatively charged particle group 34A moves to the side of the display substrate 20 and reaches the side of the display substrate 20 (see FIG. 2B). On the other hand, the positively charged particles constituting the particle group 34B move to the side of the back substrate 22 and reach the back substrate 22 (see FIG. 2B).

At this time, the color of the display medium 12 visually recognized from the side of the display substrate 20 is a color of the particle group 34A while the white color of the reflective particle group 36 is visually recognized as a background color. In addition, the particle group 34B is hidden by the reflective particle group 36, and it becomes difficult to visually recognize the particle group 34B.

According to the display device 10 of the exemplary embodiment, display is performed by the particle group 34 (the particle group 34A and the particle group 34B) reaching the display substrate 20 or the back substrate 22 and adhering thereto as described above.

Although the above description is given of a case where the surface electrode 40 is provided at the display substrate 20 and the back surface electrode 46 is provided at the back substrate 22 in the display medium 12 and the display device 10 according to the exemplary embodiment, voltage is applied between the electrodes (that is, between the substrates), and display is performed by causing the particle group 34 to move (migrate) between the substrate, the present invention is not limited thereto. A configuration in which the particle group 34 may be caused to move between the electrodes, for example, a configuration in which the surface electrode 40 is provided at the display substrate 20, an electrode is provided at the gap member, and display is performed by applying voltage between the electrodes and causing the particle group 34 to move between the display substrate 20 and the gap member.

Although the above description is given of a case where the display medium 12 is configured such that the surface electrode 40 is provided at the display substrate 20 and the back surface electrode 46 is provided at the back substrate 22 in the display medium 12 and the display device 10 according to the exemplary embodiment, the respective electrodes may be arranged outside the display medium 12.

Although the above description is given of a case where two kinds (two colors) of particle groups (34A and 34B) are applied as the particle group 34 in the display medium 12 and the display device 10 according to the exemplary embodiment, one kind (one color) of particle group may also be applied, or three or more kinds (three or more colors) of particle groups may also be applied.

Although the present invention will be specifically described below based on examples, the present invention is not limited to the examples.

Hereinafter, "parts" is based on weight unless otherwise specified.

EXAMPLES 1 to 20

Generation of Specific Copolymer 1

71 parts of a specific reactive compound which contains a polydimethylsiloxane chain (product name: FM-0721, Mn=5000, manufactured by JNC Corporation), 29 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts by weight of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 1 is obtained. The obtained specific copolymer reaction liquid 1 is redeposited in ethanol, the amount of which is ten times as large as the amount of the specific copolymer reaction liquid 1, and dried, and specific copolymer 1 is obtained. A weight average molecular weight is 49,000.

Generation of Specific Copolymer 2

85 parts of a specific reactive compound which contains a polydimethylsiloxane chain (product name: FM-0721, Mn=5000, manufactured by JNC Corporation), 15 parts of a specific vinyl compound (vinylnaphthalene (VNp) manufactured by Nippon Steel & Sumikin Chemical Co., Ltd.), 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 0.45 parts of lauroyl peroxide (LPO manufactured by Sigma-Aldrich Co. LLC) is added to the content in the flask. While the temperature of the content in the flask is maintained at 75° C., 0.45 parts of LPO is added twice every two hours. The content is cooled to a room temperature six hours after the first addition of LPO, and specific copolymer reaction liquid 2 is obtained. The obtained specific copolymer reaction liquid 2 is redeposited in isopropyl alcohol, the amount of which is ten times as large as the amount of the specific copolymer reaction liquid 2, and dried, and specific copolymer 2 is obtained. A weight average molecular weight is 58,000.

Generation of Specific Copolymer 3

95 parts of a specific reactive compound which contains a polydimethylsiloxane chain (product name: FM-0721, Mn=5000, manufactured by JNC Corporation), 5 parts of a specific vinyl compound (vinylbiphenyl (VBP) manufactured by Nippon Steel & Sumikin Chemical Co., Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 0.19 part of lauroyl peroxide (LPO manufactured by Sigma-Aldrich Co. LLC) is added to the content in the flask. While the temperature of the content in the flask is maintained at 75° C., 0.19 part of LPO is added twice every two hours. The content is cooled to a room temperature six hours after the first addition of LPO, and specific copolymer reaction liquid 3 is obtained. The obtained specific copolymer reaction liquid 3 is redeposited in isopropyl alcohol, the amount of which is ten times as large as the amount of the specific copolymer reaction liquid 3, and dried, and specific copolymer 3 is obtained. A weight average molecular weight is 71,000.

Generation of Specific Copolymer 4

85 parts of a specific reactive compound which contains a polydimethylsiloxane chain (product name: MCS-M11, manufactured by Gelest Inc.), 15 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 4 is obtained. The obtained specific copolymer reaction liquid 4 is redeposited in isopropyl alcohol, the amount of which is ten times as large as the amount of the specific copolymer reaction liquid 4, and dried, and specific copolymer 4 is obtained. A weight average molecular weight is 55,000.

Generation of Specific Copolymer 5

80 parts of a specific reactive compound which contains a polydimethylsiloxane chain (product name: RTT-1011, manufactured by Gelest Inc.), 20 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 5 is obtained. The obtained specific copolymer reaction liquid 5 is redeposited in isopropyl alcohol, the amount of which is ten times as large as the amount of the specific copolymer reaction liquid 5, and dried, and specific copolymer 5 is obtained. A weight average molecular weight is 52,000.

Generation of Specific Copolymer 6

80 parts of a specific reactive compound which contains a polydimethylsiloxane chain (product name: MCR-V21, manufactured by Gelest Inc.), 20 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 6 is obtained. The obtained specific copolymer reaction liquid 6 is redeposited in isopropyl alcohol, the amount of which is ten times as large as the amount of the specific copolymer reaction liquid 6, and dried, and specific copolymer 6 is obtained. A weight average molecular weight is 53,000.

Generation of Specific Copolymer 7

85 parts of a specific reactive compound which contains a polydimethylsiloxane chain (product name: MCS-V12, manufactured by Gelest Inc.), 15 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 7 is obtained. The obtained specific copolymer reaction liquid 7 is redeposited in isopropyl alcohol, the amount of which is ten times as large as the amount of the specific copolymer reaction liquid 7, and dried, and specific copolymer 7 is obtained. A weight average molecular weight is 58,000.

Generation of Specific Copolymer 8

80 parts of a specific reactive compound which contains a polydimethylsiloxane chain (product name: VTT-106, manufactured by Gelest Inc.), 20 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 8 is obtained. The obtained specific copolymer reaction liquid 8 is redeposited in isopropyl alcohol, the amount of which is ten times as large as the amount of the specific copolymer reaction liquid 8, and dried, and specific copolymer 8 is obtained. A weight average molecular weight is 57,000.

Generation of Specific Copolymer 9

71 parts of a specific reactive compound which contains a polydimethylsiloxane chain (product name: FM-0721, Mn=5000, manufactured by JNC Corporation), 28 parts of a specific vinyl compound (styrene manufactured by Wako Pure Chemical Industries, Ltd.), 1 part of another polymerizable monomer (MMA), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 9 is obtained. The obtained specific copolymer reaction liquid 9 is redeposited in isopropyl alcohol, the amount of which is ten times as large as the amount of the specific copolymer reaction liquid 9, and dried, and specific copolymer 9 is obtained. A weight average molecular weight is 50,000.

Generation of Specific Copolymer 10

71 parts of a specific reactive compound which contains a polydimethylsiloxane chain (product name: FM-0721, Mn=5000, manufactured by JNC Corporation), 28 parts of a specific vinyl compound (styrene manufactured by Wako Pure Chemical Industries, Ltd.), 1 part of another polymerizable monomer (DEAEMA), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 1.13 parts of lauroyl peroxide (LPO manufactured by Sigma-Aldrich Co. LLC) is added to the content in the flask. While the temperature of the content in the flask is maintained at 75° C., 1.13 parts of LPO is added twice every two hours. The content is cooled to a room temperature six hours after the first addition of LPO, and specific copolymer reaction liquid 10 is obtained. The obtained specific copolymer reaction liquid 10 is redeposited in isopropyl alcohol, the amount of which is ten times as large as the amount of the specific copolymer reaction liquid 10, and dried, and specific copolymer 10 is obtained. A weight average molecular weight is 52,000.

Generation of Specific Copolymer 11

81 parts of a specific reactive compound which contains an alkyl chain (product name: stearyl methacrylate (SMA) manufactured by Tokyo Chemical Industry Co., Ltd.), 19 parts of a specific vinyl compound (styrene manufactured by Wako Pure Chemical Industries, Ltd.), and 100 parts of toluene (manufactured by Kanto Chemical Co., Inc.) are prepared in a flask provided with a stirrer, a nitrogen gas introducing tube, a thermometer, and a reflux cooling tube, nitrogen substitution is performed by stirring the mixture for thirty minutes while nitrogen gas is put into the flask, and the temperature of the content in the flask is then raised to 75° C. Thereafter, 0.85 part by weight of lauroyl peroxide (LPO manufactured by Sigma-Aldrich Co. LLC) is added to the content in the flask. While the temperature of the content in the flask is maintained at 75° C., 0.85 part of LPO is added twice every two hours. The content is cooled to a room temperature six hours after the first addition of LPO, and specific copolymer reaction liquid 11 is obtained. The obtained specific copolymer reaction liquid 11 is redeposited in ethanol, the amount of which is ten times as large as the amount of the specific copolymer reaction liquid 11, and dried, and specific copolymer 11 is obtained. A weight average molecular weight is 21,000.

Generation of Granular Substance

Next, solution is produced by adding specific copolymer and polymerizable monomer to solvent in accordance with a composition described in Table 1. Then, the solution is heated at 65° C. for twenty four hours, and granular substances are generated.

In addition, KF-96L-1cs represents dimethyl silicone oil (KF-96L-1cs manufactured by Shin-Etsu Chemical Co., Ltd., viscosity: 1 cs), and Solvent A has a composition obtained by mixing the following solvents.

Composition of Solvent A

Isopar M (Isopar M: registered trademark, manufactured by Exxon Mobil Corporation): 71.4 parts by weight Hexane (manufactured by Kanto Chemical Co., Inc.): 14.3 parts by weight Toluene (manufactured by Kanto Chemical Co., Inc.): 14.3 parts by weight Preparation of White Particle Dispersion White particle dispersion in which granular white particles are dispersed is prepared by performing solvent substitution on the raw material solution, in which the granular substances are generated, with dimethyl silicone oil (KF-96L-2cs manufactured by Shin-Etsu Chemical Co., Ltd., viscosity: 2cs). However, Isopar M is used as a dispersion medium in Example 20.

Comparative Examples 1 to 10

Solution is prepared by mixing raw material constituents (a specific reactive compound, a specific vinyl compound, another polymeizable monomer) based on the compositions described in Table 2, 0.03 part by weight of lauroyl peroxide (manufactured by Sigma-Aldrich Co., LLC) as a polymerization initiator, and solvent which is shown as solvent in Table 2. Then, the solution is heated at 65° C. for twenty four hours, and granular substances are generated.

In addition, KF-96L-1cs and Solvent A in Table 2 are the same as that described above.

Next, solvent substitution is performed on the solvent, in which the granular substances are generated, with dimethyl silicone oil (KF-96L-2cs manufactured by Shin-Etsu Chemical Co., Ltd., viscosity: 2cs), and white particle dispersion in which granular white particles are dispersed is prepared. However, Isoper M is used as a dispersion medium in Comparative Example 11.

Evaluation

The obtained white particle dispersion is evaluated as follows. The results will be shown in Table 3.

Property

The content of the specific reactive compound (the reactive compound which contains a silicone chain or an alkyl chain) in the white particles in the obtained white particle dispersion, and a volume average particle size D50v are measured by the methods as described above. In addition, a weight average molecular weight Mw of the white particles (polymer compounds constituting the white particles) is measured by the method as described above.

Y Value

Element samples are produced by sealing the white particle dispersion, of which concentration of particle solid content with respect to the dispersion medium is adjusted to 25% by weight, between a pair of glass substrates (the thickness of each glass substrate is 1.1 mm) (in a cell formed by interposing a spacer (gap member) with a size of 50 μm between the pair of glass substrates) in which indium tin oxide (ITO) electrodes are formed.

Then, Y values of the produced element samples are measured. The Y values of the particle dispersion for display are measured by using a colorimeter X-Rite 404 (manufactured by X-Rite Inc.).

Viscosity

The viscosity of the white particle dispersion, of which concentration of particle solid content with respect to the dispersion medium is adjusted to 25% by weight, is measured by the method as described above.

Charge Amount

Element samples, each of which has a display area of 2 cm×2 cm, are produced by adjusting the obtained white particle dispersion such that the particle solid content becomes 10% by weight and sealing the white particle dispersion between the pair of glass substrates (in a cell formed by interposing a spacer (gap member) with a size of 50 μm between the pair of glass substrates) in which indium tin oxide (ITO) electrodes are formed. Then, the charge amounts of the element samples are measured by using 6515 SYSTEMELECTROMETER (manufactured by Keithley Instruments Inc.), and charge amounts per display area ($nC/cm^2$) are calculated.

TABLE 1

| | | Generation of specific copolymer | | | | Generation of granular substances (white particles) | | |
|---|---|---|---|---|---|---|---|---|
| | No. | Specific reactive compound Type/ number of parts | Specific vinyl compound Type/ number of parts | Another Polymerizable monomer Type/ number of parts | Specific Copolymer Mw | Solvent Type/number of parts | Specific copolymer Type/number of parts | Polymerizable monomer Type/ number of parts |
| Example 1 | 1 | FM0721/71 parts | St/29 parts | — | 49000 | KF-96L-1cs/82 parts | Specific copolymer 1/0.9 part | St/14 parts |
| Example 2 | 1 | FM0721/71 parts | St/29 parts | — | 49000 | KF-96L-1cs/82 parts | Specific copolymer 1/0.9 part | VNp/22 parts |
| Example 3 | 1 | FM0721/71 parts | St/29 parts | — | 49000 | Solvent A/82 parts | Specific copolymer 1/0.9 part | VBP/3 parts |
| Example 4 | 2 | FM0721/85 parts | VNp/15 parts | — | 58000 | KF-96L-1cs/82 parts | Specific copolymer 2/0.9 part | St/12 parts |
| Example 5 | 2 | FM0721/85 parts | VNp/15 parts | — | 58000 | KF-96L-1cs/82 parts | Specific copolymer 2/0.9 part | VNp/18 parts |
| Example 6 | 2 | FM0721/85 parts | VNp/15 parts | | 58000 | Solvent A/82 parts | Specific copolymer 2/0.9 part | VBP/8.6parts |
| Example 7 | 3 | FM0721/95 parts | VBP/5 parts | — | 71000 | KF-96L-1cs/82 parts | Specific copolymer 3/0.9 part | St/10 parts |
| Example 8 | 3 | FM0721/95 parts | VBP/5 parts | — | 71000 | KF-96L-1cs/82 parts | Specific copolymer 3/0.9 part | VNp/15 parts |
| Example 9 | 3 | FM0721/95 parts | VBP/5 parts | — | 71000 | Solvent A/82 parts | Specific copolymer 3/0.9 part | VBP/2.2 parts |
| Example 10 | 4 | MCS-M11/85 parts | St/15 parts | — | 55000 | KF-96L-1cs/82 parts | Specific copolymer 4/0.9 part | VNp/20 parts |
| Example 11 | 5 | RTT-1011/80 parts | St/20 parts | — | 52000 | KF-96L-1cs/82 parts | Specific copolymer 5/0.9 part | VNp/20 parts |
| Example 12 | 6 | MCR-V21/80 parts | St/20 parts | — | 53000 | KF-96L-1cs/82 parts | Specific copolymer 6/0.9 part | VNp/20 parts |
| Example 13 | 7 | MCS-V12/85 parts | St/15 parts | — | 58000 | KF-96L-1cs/82 parts | Specific copolymer 7/0.9 part | VNp/20 parts |
| Example 14 | 8 | VTT-106/80 parts | St/20 parts | — | 57000 | KF-96L-1cs/82 parts | Specific copolymer 8/0.9 part | VNp/20 parts |
| Example 15 | 9 | FM0721/71 parts | St/28 parts | MAA/1 part | 50000 | KF-96L-1cs/82 parts | Specific copolymer 9/0.9 part | VNp/20 parts |
| Example 16 | 10 | FM0721/71 parts | St/28 parts | DEAEMA/ 1 part | 52000 | KF-96L-1cs/82 parts | Specific copolymer 10/0.9 part | VNp/20 parts |
| Example 17 | 3 | FM0721/95 parts | VBp/5 parts | — | 71000 | KF-96L-1cs/82 parts | Specific copolymer 3/0.9 part | VNp/10 parts |
| Example 18 | 3 | FM0721/95 parts | VBp/5 parts | — | 71000 | KF-96L-1cs/82 parts | Specific copolymer 3/0.9 part | VNp/20 parts |
| Example 19 | 1 | FM0721/71 parts | St/29 parts | — | 49000 | KF-96L-1cs/82 parts | Specific copolymer 1/0.9 part | (St/DVB)/ (13.8/0.2)parts |
| Example 20 | 11 | SMA/81 parts | St/19 parts | — | 21000 | Solvent A/82 parts | Specific copolymer 11/0.7 part | VBP/10 parts |

TABLE 2

| | Specific reactive compound Type/number of parts | Specific vinyl compound Type/number of parts | Another polymerizable monomer Type/number of parts | Solvent Type/number of parts |
|---|---|---|---|---|
| Comparative Example 1 | FM0721/0.5 part | St/1 part | — | KF-96L-1cs/4 parts |
| Comparative Example 2 | FM0721/1 part | VNp/1 part | — | KF-96L-1cs/5 parts |
| Comparative Example 3 | FM0721/0.7 pars | VBP/1 part | — | Solvent A/14 parts |
| Comparative Example 4 | MCS-M11/1.2 parts | VNp/1 part | — | KF-96L-1cs/5 parts |
| Comparative Example 5 | RTT-011/1.2 parts | VNp/1 part | — | KF-96L-1cs/5 parts |
| Comparative Example 6 | MCR-V21/1.1 parts | VNp/1 part | — | KF-96L-1cs/5 parts |
| Comparative Example 7 | MCS-V12/1 part | VNp/1 part | — | KF-96L-1cs/5 parts |
| Comparative Example 8 | VTT-106/1.2 parts | VNp/1 part | — | KF-96L-1cs/5 parts |
| Comparative Example 9 | FM0721/1 parts | VNp/0.95 part | MAA/0.05 part | KF-96L-1cs/5 parts |
| Comparative Example 10 | FM0721/1 parts | VNp/0.95 part | DEAEMA/0.05 part | KF-96L-1cs/5 parts |
| Comparative Example 11 | SMA/0.7 part | VBP/1 part | — | Solvent A/14 parts |

TABLE 3

Properties of white particle dispersion

| | Content of specific reactive compound (% by weight with respect to particles) | D50v (nm) | Charge amount per display area (nC/cm$^2$) | Y value (%) | Viscosity (cP) |
|---|---|---|---|---|---|
| Example 1 | 2.7 | 450 | 0.64 | 37.0 | 4.2 |
| Example 2 | 2.6 | 420 | 0.25 | 41.0 | 3.9 |
| Example 3 | 2.6 | 444 | 0.38 | 40.5 | 3.8 |
| Example 4 | 2.5 | 423 | 0.32 | 40.5 | 4.0 |
| Example 5 | 2.3 | 398 | 0.34 | 42.8 | 3.8 |
| Example 6 | 2.2 | 420 | 0.20 | 41.5 | 3.7 |
| Example 7 | 2.0 | 463 | 0.27 | 41.0 | 4.0 |
| Example 8 | 2.4 | 433 | 0.34 | 43.2 | 4.0 |
| Example 9 | 2.2 | 412 | 0.28 | 42.1 | 3.6 |
| Example 10 | 2.4 | 438 | 0.25 | 41.5 | 3.8 |
| Example 11 | 2.3 | 451 | 0.33 | 40.3 | 4.4 |
| Example 12 | 2.2 | 423 | 0.42 | 42.3 | 4.2 |
| Example 13 | 2.4 | 446 | 0.26 | 41.1 | 4.3 |
| Example 14 | 2.0 | 420 | 0.28 | 41.5 | 4.1 |
| Example 15 | 2.4 | 452 | 1.42 | 40.5 | 4.5 |
| Example 16 | 2.3 | 426 | 1.94 | 40.0 | 4.4 |
| Example 17 | 2.6 | 204 | 0.93 | 37.3 | 4.4 |
| Example 18 | 1.9 | 1459 | 0.13 | 40.5 | 3.4 |
| Example 19 | 2.2 | 413 | 0.32 | 39.2 | 3.6 |
| Example 20 | 2.6 | 432 | 0.33 | 43.3 | 4.2 |
| Comparative Example 1 | 3.9 | 412 | 0.72 | 30.2 | 5.3 |
| Comparative Example 2 | 3.5 | 432 | 0.25 | 35.2 | 4.8 |
| Comparative Example 3 | 3.6 | 420 | 0.23 | 35.0 | 5.1 |
| Comparative Example 4 | 3.4 | 425 | 0.34 | 32.3 | 5.3 |
| Comparative Example 5 | 3.3 | 413 | 0.31 | 34.4 | 5.2 |
| Comparative Example 6 | 3.2 | 402 | 0.28 | 32.6 | 5.0 |
| Comparative Example 7 | 3.3 | 453 | 0.34 | 33.3 | 5.2 |
| Comparative Example 8 | 3.2 | 466 | 0.39 | 34.0 | 5.1 |
| Comparative Example 9 | 3.1 | 398 | 2.30 | 30.3 | 5.7 |
| Comparative Example 10 | 3.3 | 423 | 1.95 | 30.5 | 5.6 |
| Comparative Example 11 | 4.0 | 446 | 0.62 | 33.2 | 5.9 |

It can be understood from the above results that the pure whiteness and refractive indexes of white particles in the examples are higher than those in the comparative examples.

In addition, it can also be understood that the viscosity of the white particle dispersion is lower in the examples than that in the comparative examples.

The abbreviations used in Tables 1 and 2 are as follows.

Specific Reactive Compounds

FM0721: SILAPLANE FM-0721 (manufactured by JNC Corporation, weight average molecular weight Mw=5000; Structure Formula (1) [R$^1$=a methyl group, R1'=a butyl group, m=58, x=3]; a specific reactive compound which contains a silicone chain)

MCS-M11: MCS-M11 (manufactured by Gelest Inc.; a specific reactive compound which contains a silicone chain as shown above)

RTT-1011: RTT-1011 (manufactured by Gelest Inc.; a specific reactive compound which contains a silicone chain as shown above)

MCR-V21: MCR-V21 (manufactured by Gelest Inc.; a specific reactive compound which contains a silicone chain as shown above)

MCS-V12: MCS-V12 (manufactured by Gelest Inc.; a specific reactive compound which contains a silicone chain as shown above)

VTT-106: VTT-106 (manufactured by Gelest Inc.; a specific reactive compound which contains a silicone chain as shown above)

SMA: stearyl methacrylate (manufactured by Tokyo Chemical Industry Co., Ltd.; a specific reactive compound which contains an alkyl chain)

Specific Vinyl Compound

St: styrene (manufactured by Wako Pure Chemical Industries, Ltd.)

VNp: 2-vinylnaphthalene (manufactured by Nippon Steel & Sumikin Chemical Co., Ltd.)

VBP: 4-vinylbiphenyl (manufactured by Nippon Steel & Sumikin Chemical Co., Ltd.)

DVB: divinylbenzene (manufactured by Wako Pure Chemical Industries, Ltd.)

Polymerizable Monomer

MAA: methacrylic acid

DEAEMA: diethylaminoethyl methacrylate

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Particles for display comprising:
   a copolymer that contains at least, as copolymer constituents, a reactive compound containing a silicone chain or an alkyl chain and a vinyl compound represented by Formula (1),
   wherein a content of the reactive compound containing a silicone chain or an alkyl chain is 3.0% by weight or less with respect to the weight of the particles:

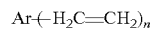

Formula (1)

wherein in Formula (1), Ar represents an unsubstituted aromatic ring or an aromatic ring that is substituted with an alkyl group having 1 to 6 carbon atoms, or an aryl group having 6 to 12 carbon atoms, and n represents an integer from 1 to 4.

2. The particles for display according to claim 1, wherein a content of the reactive compound containing a silicone chain or an alkyl chain with respect to the total amount of the particles for display is from 0.05% by weight to 3% by weight.

3. The particles for display according to claim 1, wherein a content of the reactive compound containing a silicone chain or an alkyl chain with respect to the total amount of the particles for display is from 1% by weight to 3% by weight.

4. The particles for display according to claim 1, wherein a volume average particle size is from 50 nm to 30,000 nm.

5. The particles for display according to claim 1, wherein a volume average particle size is from 100 nm to 2,000 nm.

6. The particles for display according to claim 1, wherein a volume average particle size is from 150 nm to 1,000 nm.

7. The particles for display according to claim 1, wherein a refractive index of the vinyl compound represented by Formula (1) is from 1.50 to 1.80.

8. The particles for display according to claim 1, wherein a refractive index of the reactive compound containing a silicone chain or an alkyl chain is lower than a refractive index of the vinyl compound represented by Formula (1).

9. The particles for display according to claim 1, wherein a weight average molecular weight of the copolymer is from 5,000 and to 2,000,000.

10. The particles for display according to claim 1, wherein a copolymerization ratio between the reactive compound containing a silicone chain or an alkyl chain and the vinyl compound represented by Formula (1) (the reactive compound containing a silicone chain or an alkyl chain/the vinyl compound represented by Formula (1)) in the copolymer is from 0.5/99.5 to 99.5/0.5 in terms of weight ratio.

11. The particles for display according to claim 1, wherein a copolymerization ratio between the reactive compound containing a silicone chain or an alkyl chain and the vinyl compound represented by Formula (1) (the reactive compound containing a silicone chain or an alkyl chain/the vinyl compound represented by Formula (1)) in the copolymer is from 1/99 to 99/1 in terms of weight ratio.

12. The particles for display according to claim 1, further comprising as the copolymer constituents:
another polymerizable monomer.

13. The particles for display according to claim 11, wherein a copolymerization ratio of the reactive compound containing a silicone chain or an alkyl chain, the vinyl compound represented by Formula (1), and another polymerizable monomer (another polymerizable monomer/the reactive compound containing a silicone chain or an alkyl chain +the vinyl compound represented by Formula (1)) in the copolymer is from 0.01/99.99 to 99.99/0.01 in terms of weight ratio.

14. The particles for display according to claim 1, wherein the particles for display are formed by copolymerizing a copolymer of the reactive compound containing an silicone chain or an alkyl chain and the vinyl compound represented by Formula (1) with a polymerizable monomer.

15. A particle dispersion for display comprising:
a particle group that contains the particles for display according to claim 1; and
a dispersion medium that disperses the particle group therein.

16. The particle dispersion for display according to claim 15, wherein a viscosity of the dispersion at 25° C. and when content of the particles with respect to the dispersion medium is 25% by weight is from 2 cP to 10 cP.

17. The particle dispersion for display according to claim 15, wherein a viscosity of the dispersion at 25° C. and when content of the particles with respect to the dispersion medium is 25% by weight is from 2 cP to 8 cP.

18. The particle dispersion for display according to claim 15, wherein a viscosity of the dispersion at 25° C. and when content of the particles with respect to the dispersion medium is 25% by weight is from 2 cP to 5 cP.

19. A display medium comprising:
a pair of substrates or a pair of electrodes, at least one of which has transparency; and
a region that includes the particle dispersion for display according to claim 15 sealed between the pair of substrates or the pair of electrodes.

20. A display device comprising:
the display medium according to claim 19; and
a voltage applying unit that applies voltage between the pair of substrates or between the pair of electrodes of the display medium.

* * * * *